(12) United States Patent
Martinent et al.

(10) Patent No.: US 8,476,323 B2
(45) Date of Patent: Jul. 2, 2013

(54) FLUOROCARBON POLYMER MATERIAL AND METHOD FOR SYNTHESIZING

(75) Inventors: Audrey Martinent, Grenoble (FR); Ali Alaaeddine, Beirut (LB); Bruno Ameduri, Montpellier (FR); Philippe Capron, Le Pin (FR)

(73) Assignees: Commissariat a l'Energie Atomique et aux Energies Alternatives, Paris (FR); Centre Nationale de Recherche Scientifique, Paris (FR); Ecole Nationale Superieure de Chimie de Montpellier, Montpellier (FR)

( * ) Notice: Subject to any disclaimer, the term of this patent is extended or adjusted under 35 U.S.C. 154(b) by 254 days.

(21) Appl. No.: 13/019,634

(22) Filed: Feb. 2, 2011

(65) Prior Publication Data
US 2011/0190404 A1    Aug. 4, 2011

(30) Foreign Application Priority Data
Feb. 2, 2010   (FR) ..................................... 10 00404

(51) Int. Cl.
*B01J 41/14*    (2006.01)
*C08F 214/24*   (2006.01)

(52) U.S. Cl.
USPC .............................. 521/27; 526/248; 526/247

(58) Field of Classification Search
USPC ..................................... 521/27; 526/248, 247
See application file for complete search history.

(56) References Cited

FOREIGN PATENT DOCUMENTS
EP    0 166 015 A1    1/1986
EP      166015 A1 *  1/1986

OTHER PUBLICATIONS

Matsui et al.; "Novel Anion Exchange Membranes Having Fluorocarbon Backbone: Preparation and Stability;" *Journal of Applied Polymer Science*; 1986; pp. 4137-4143; vol. 32; John Wiley & Sons, Inc.

Valade et al.; "Synthesis and Modification of Alternating Copolymers Based on Vinyl Ethers, Chlorotrifluoroethylene, and Hexafluoropropylene;" *Macromolecules*; 2009; pp. 7689-7700; vol. 42; American Chemical Society.

Hayakawa et al.; "Newperfluoropolymers bearing dialkylamino groups as side chains;" *Polymer*; pp. 2807-2812; 1995; vol. 36, No. 14; Elsevier Publishing; XP-002592173.

Hedhli et al.; "Preparation and amphiphilic properties of cationic and amphoteric polymerizable surfactants derived from 5-F-alkyl-4-oxa-1-dimethylaminohex-5-en-2-ols;" *Journal of Dispersion Science and Technology*; 1994; pp. 639-655; vol. 15, No. 6; Dekker Publishing; XP-002592174.

Sawada et al.; "Synthesis and properties of fluoroalkylated 2-acryloxyethyltrimethylammonium chloride oligomers;" *Nihon Yukagakkaishi*; 1996; pp. 161-169; vol. 45, No. 2; Nihon Yukagaku Gakki Publishing; XP-002592175.

* cited by examiner

*Primary Examiner* — Michael M Bernshteyn
(74) *Attorney, Agent, or Firm* — Oliff & Berridge, PLC

(57) ABSTRACT

The invention relates to a fluorocarbon polymer material comprising a backbone with the following unit:

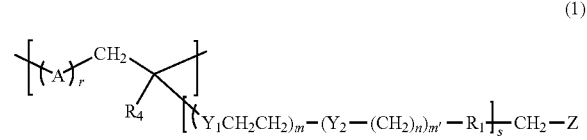

(1)

wherein:
Z is a quaternary ammonium group,
$Y_1$ and $Y_2$ are each independently an oxygen heteroatom or a sulphur heteroatom,
A is a fluorinated or perfluorinated straight chain having from 2 to 6 carbon atoms,
$R_1$ represents a phenyl or aryl group or a —$CR_2R_3$— group, and
$R_4$ is selected from the group consisting of a hydrogen atom, a straight or branched, cyclic or acyclic, alkyl or halogenated alkyl group, and a group represented by the following formula:

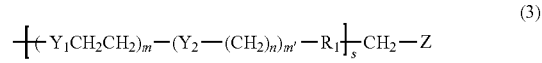

(3)

m is an integer comprised between 0 and 10, preferably between 0 and 3;
m', n and r are integers, each independently equal to 0 or 1; and
s is equal to 0 or 1, provided that when s is equal to 0, then $R_4$ is different from the hydrogen atom.

20 Claims, No Drawings

FLUOROCARBON POLYMER MATERIAL AND METHOD FOR SYNTHESIZING

BACKGROUND OF THE INVENTION

The invention relates to a fluorocarbon polymer material which comprises a fluorinated backbone and at least one pendant chain having a quaternary ammonium group.

The present invention also relates to a method for synthesizing a fluorocarbon polymer material.

STATE OF THE ART

Anion exchange membranes, i.e. membranes which are permeable to anions or anionic membranes, are commonly used in different fields, in particular in electrodialysis for desalination of brackish water, treatment of industrial waters and effluents, the chlorine-sodium hydroxide industry and the electrochemistry field.

In particular, certain hydroxide ion exchange membranes that possess groups of quaternary ammonium hydroxide type have a sufficient ion conductivity for use as hydroxide ion exchange electrolyte for Alkaline Fuel Cells (AFC). These membranes are also used as electrode impregnation materials or conductive binder for anodic or cathodic catalytic layers of fuel cells.

Anion exchange membranes have recently been developed from fluorocarbon polymers. Among these, polymers available on the market under the NAFION® trademark from Dupont de Nemours can be cited. In particular, anion exchange membranes stable in an acid environment have been described. These anion exchange membranes are obtained by post-functionalization i.e. by chemical modification of sulfonic and carboxylic NAFION® polymers. They present good mechanical properties and a high aging resistance.

In the article "Novel anion exchange membranes having fluorocarbon backbone: preparation and stability", (*J. Appl. Polym. Sci.*, 1986, n° 32, P. 4137-43), K. Matsui et al. described a synthesis scheme which consists in chemically modifying Nafion® carrying carboxylic acid functions to introduce a tertiary amine function and to then quaternize the amine function into ammonium according to the following reaction scheme:

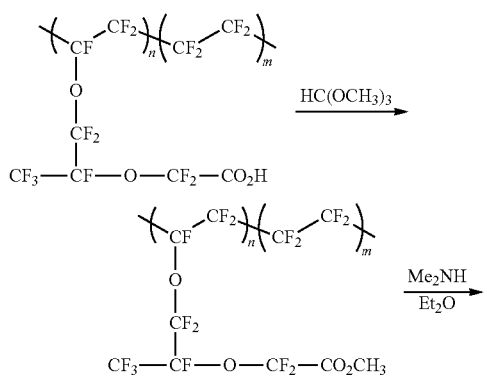

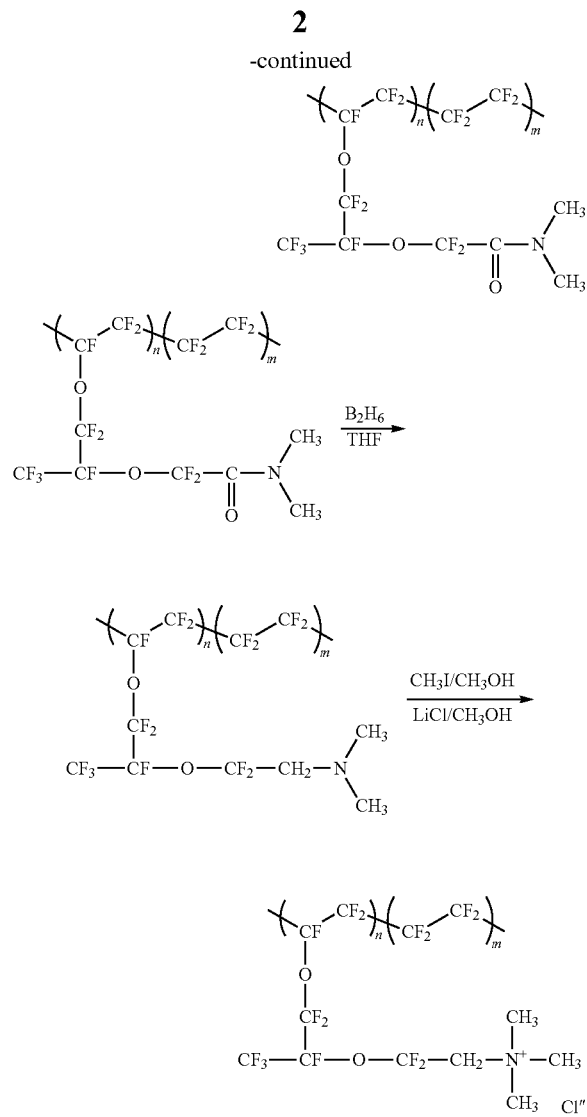

An example of post-functionalization of a sulfonic Nafion® polymer is further described in the document EP-A-0166015. The synthesis process implemented consists in introducing alkyl sequences carrying a tertiary amine function by condensing a diamine with the sulphuric acid function of the sulfonic Nation® polymer. The tertiary amine functions are then transformed into ammonium functions by quaternization. A synthesis example is illustrated by the following reaction scheme:

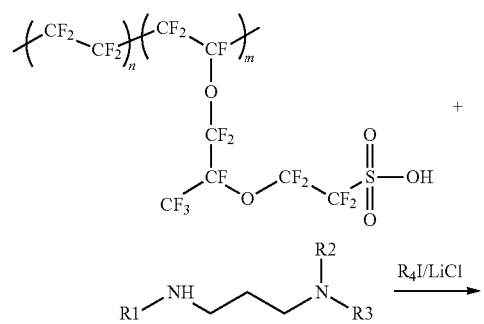

-continued

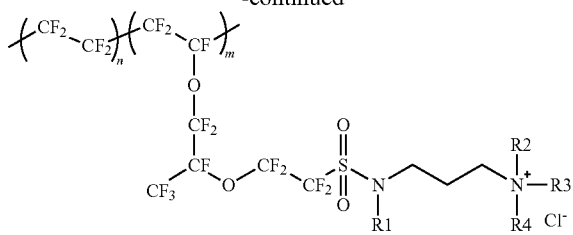

with $R_1$ = H, alkyl
$R_2, R_3, R_4$ = alkyl

The anion exchange membranes obtained by means of these methods for synthesizing are however unstable in a highly alkaline medium and are difficult to recycle. The starting NAFION® polymers are moreover costly and control of the degree of functionalization by post-functionalization is delicate to perform.

Recent works have been carried out to increase the stability of these to polymers in an alkaline medium. In particular, in the article "Synthesis and Modification of Alternating Copolymers Based on Vinyl Ethers, Chlorotrifluoroethylene, and Hexafluoropropylene", (*Macromolecules,* 2009, n° 42, P. 7889-7700), Valade et al. described a fluorocarbon polymer carrying a quaternary ammonium group stable in an alkaline medium.

OBJECT OF THE INVENTION

The object of the invention is to remedy the drawbacks of the prior art, and in particular to propose a polymer material that is chemically stable in an alkaline medium and that has good electrochemical performances, in particular combining a high ionic conduction and a good mechanical strength.

Another object of the invention is to propose a method for synthesizing a fluorocarbon polymer material that is stable in a highly alkaline medium and has a good ionic conductivity. It is a further object of the invention to provide an industrial method for synthesizing whereby the ionic conductivity of the polymer material can be controlled.

According to the invention, this object is achieved by a fluorocarbon polymer material and a method for synthesizing a fluorocarbon polymer material according to the appended claims.

In particular, this object is achieved by the fact that the backbone comprises a unit of the following general formula (1):

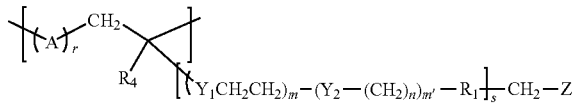

wherein
Z is a quaternary ammonium group,
$Y_1$ and $Y_2$ are each independently an oxygen heteroatom or a sulphur heteroatom,
A is a fluorinated or perfluorinated straight chain having from 2 to 6 carbon atoms,
$R_1$ represents a phenyl or aryl group or a group of the following formula (2):

$$—CR_2R_3—\quad(2)$$

wherein
$R_2$ and $R_3$ are identical or different and each selected independently from the group consisting of a straight or branched alkyl group, optionally substituted by one or more halogens,
$R_4$ is selected from the group consisting of a hydrogen atom, a straight or branched, cyclic or acyclic, alkyl or halogenated alkyl group, and a group represented by the following formula (3):

m is an integer comprised between 0 and 10, preferably between 0 and 3;
m', n and r are integers, each independently equal to 0 or 1; and
s is equal to 0 or 1, provided that when s is equal to 0, then $R_4$ is different from the hydrogen atom.

According to a development of the invention, A is represented by the following formula (4):

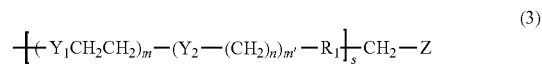

wherein
W represents a fluorine, bromine or chlorine atom, a —$CF_3$ group or a —$OC_uF_{2u+1}$ group where u is equal to 1, 2 or 3.

This object is also achieved by a method for synthesizing a fluorocarbon polymer material which comprises a copolymerization step of at least:
a first monomer selected from fluorinated vinyl monomers,
a second monomer represented by the following formula (9):

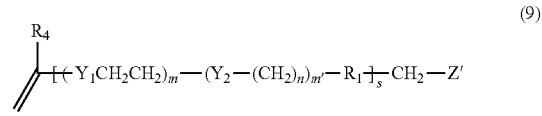

wherein
Z' represents a quaternary ammonium group or a halogen, said halogen preferably being a chlorine or iodine atom,
$Y_1$ and $Y_2$ are each independently an oxygen or a sulphur heteroatom,
$R_1$ represents a phenyl or aryl group or a group with formula (2):

wherein
$R_2$ and $R_3$ are identical or different and each selected independently from the group consisting of a straight or branched alkyl group, optionally substituted by one or more halogens,
$R_4$ is selected from the group consisting of a hydrogen atom, a straight or branched, cyclic or acyclic, alkyl or halogenated alkyl group, and a group represented by the following formula (10):

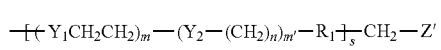 (10)

m is an integer comprised between 0 and 10, preferably between 0 and 3;
m' and n are integers, each independently equal to 0 or 1; and
s is equal to 0 or 1, provided that when s is equal to 0, then $R_4$ is different from the hydrogen atom.

DESCRIPTION OF PARTICULAR EMBODIMENTS OF THE INVENTION

According to a particular embodiment, a fluorocarbon polymer material comprises a fluorinated backbone and at least one pendant chain having a quaternary ammonium group. The backbone comprises a unit of the following general formula (1):

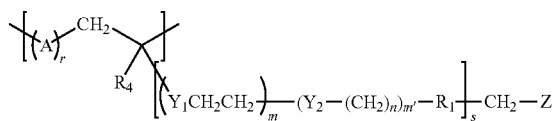 (1)

wherein
Z is a quaternary ammonium group,
$Y_1$ and $Y_2$ are each independently an oxygen heteroatom or a sulphur heteroatom,
A is a fluorinated or perfluorinated straight chain having from 2 to 6 carbon atoms,
$R_1$ represents a phenyl or aryl group or a group of the following formula (2):

 (2)

wherein
$R_2$ and $R_3$ are identical or different and each selected independently from the group consisting of a straight or branched alkyl group, optionally substituted by one or more halogens,
$R_4$ is selected from the group consisting of a hydrogen atom, a straight or branched, cyclic or acyclic, alkyl or halogenated alkyl group, and a group represented by the following formula (3):

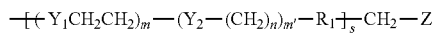 (3)

m is an integer comprised between 0 and 10, preferably between 0 and 3;
m', n and r are integers, each independently equal to 0 or 1; and
s is equal to 0 or 1, provided that when s is equal to 0, then $R_4$ is different from the hydrogen atom.

What is meant by pendant chain is a chain consisting of at least two chain links and bonded to the backbone by a covalent bond. In formula (1), the chain whose formula (3) is described above constitutes a pendant chain.

The unit represented in general formula (1) is intercalated at least once in the fluorinated backbone of the fluorocarbon polymer material. The unit can be intercalated several times, advantageously in periodic manner. The unit can be a repeating unit of the fluorocarbon polymer material. The periodicity and the number of units in the backbone are parameters which have an effect on the value of the hydroxide ion conductivity (noted "$OH^-$") and on the mechanical properties of a fluorocarbon polymer material.

A is preferably represented by the following formula (4):

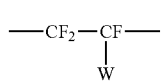 (4)

wherein
W represents a fluorine, bromine or chlorine atom, a —$CF_3$ group or a —$OC_uF_{2u+1}$ group where u is equal to 1, 2 or 3.

The backbone comprises group A of formula (4) described above. The backbone is advantageously a fluorinated straight chain.

The nature of the substituent W in group A of formula (4) can moreover enable the solubility of the fluorocarbon polymer material and its thermal and chemical resistance to be influenced. W enables the hydrophobic property of the polymer and the stability in an alkaline medium to be increased.

Polymer materials having functional groups of quaternary ammonium type present the advantage of being thermally and chemically more stable than quaternary phosphonium and sulphonium groups. Nevertheless, the presence of quaternary ammonium functions can induce or foster degradation of the polymer, in particular in an alkaline medium. Indeed, when a hydrogen atom exists on the carbon in beta position, noted C, of the quaternary ammonium group, the polymer material can undergo degradation by heating based on the following Hoffman elimination reaction:

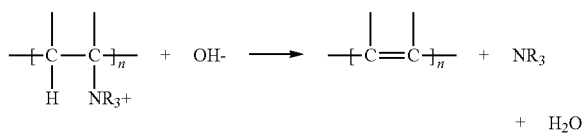

with H being an alkyl group, optionally substituted.

In this case, the acidity of the proton in beta position is increased by the positive charge of the quaternary ammonium group. The Hoffman elimination reaction results in elimination of a tertiary amine and creation of an olefin.

Furthermore, a nucleophilic substitution reaction can also occur in a highly alkaline medium according to the following reaction scheme:

Fluorocarbon polymer materials of general formula (1) are particularly stable in an alkaline medium. This stability is explained in particular by the fact that the carbon $C_\beta$ of quaternary ammonium group Z does not have any hydrogen atom.

According to a preferred embodiment, group Z of the fluorocarbon polymer material of general formula (1) described above is selected from the quaternary ammoniums of the following formula (5):

 (5)

wherein $R_5$, $R_6$ and $R_7$ are identical or different substituents, each selected independently from the group consisting of a straight or branched, cyclic or acyclic alkyl group, said substituents $R_5$, $R_6$ and $R_7$, taken together with the nitrogen atom to which they are bonded, being able to form a 4- to 7-membered heterocyclic group, having optionally a second heteroatom selected from a nitrogen, oxygen or sulphur atom; and $X^-$ is a hydroxide or halide counter-ion, preferably chloride or iodide.

Substituents $R_5$, $R_6$ and $R_7$ of formula (5) are selected such that the quaternary ammonium group is stable in a highly alkaline medium. A judicious choice of substituents $R_5$, $R_6$ and $R_7$ is made to prevent the nucleophilic substitution reaction of the quaternary ammonium group by the hydroxide groups described in the foregoing.

In particular, when quaternary ammonium group Z is in benzylic terminal position, i.e. when in formula (1) s=1 and $R_1$ is a phenyl or aryl group, a group Z will advantageously be selected known to be stable in an alkaline medium, for example the 4,4'-diazabicyclo-[2.2.2]-octane group of the following formula:

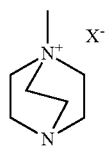

Likewise, Z is preferably a 4,4'-diazabicyclo-[2.2.2]-octane substituent for the fluorocarbon polymer materials of formula (1) in which:

s=1, m, m' and n are equal to zero; and, $R_1$ is a phenyl or aryl group.

According to a particular embodiment, the backbone of the fluorocarbon polymer material comprises at least one unit represented by the following formula (6):

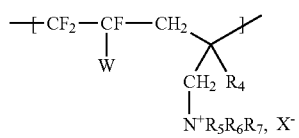

wherein

W represents a fluorine, bromine or chlorine atom, a $—CF_3$ group or a $—OC_uF_{2u+1}$ group where u is equal to 1, 2 or 3, $R_5$, $R_6$ and $R_7$ are identical or different substituents each selected independently from the group consisting of a straight or branched, cyclic or acyclic, alkyl group, said substituents $R_5$, $R_6$ and $R_7$, taken together with the nitrogen atom to which they are bonded, being able to form a 4- to 7-membered heterocyclic group, having optionally a second heteroatom selected from a nitrogen, oxygen or sulphur atom;

$X^-$ is a hydroxide or halide counter-ion, preferably chloride or iodide; and $R_4$ is selected from the group consisting of a straight or branched, cyclic or acyclic, alkyl or halogenated alkyl group, and a $—CH_2—N^+R_5R_6R_7$, $X^-$ group.

Formula (6) differs from general formula (1) in that s=0. The pendant chain is a quaternary ammonium methylene group. In this particular case, $R_4$ has to be different from a hydrogen atom so as not to introduce an instability of the fluorocarbon polymer material in alkaline medium due to the possibility of a Hoffman elimination reaction as described above.

In particular, the backbone of the fluorocarbon polymer material can comprise at least one unit represented by the following formula (7):

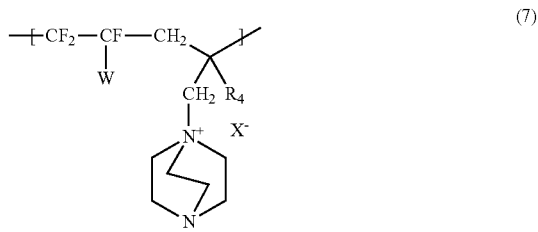

wherein

W represents a fluorine, bromine or chlorine atom, a $—CF_3$ group or a $—OC_uF_{2u+1}$ group where u is equal to 1, 2 or 3, $X^-$ is a hydroxide or halide counter-ion, preferably chloride or iodide; and $R_4$ is selected from the group consisting of a straight or branched, cyclic or acyclic, alkyl or halogenated alkyl group and a group represented by the following formula (8):

According to another particular embodiment, the pendant chain of the fluorocarbon polymer material comprises at least one $Y_1$ and/or $Y_2$ heteroatom selected from oxygen or sulphur. The fluorocarbon polymer material then has a formula (1) with s equal to 1. Introduction of a heteroatom in the pendant chain, and in particular introduction of an oxygen, can in certain cases increase the hydrophilic property of the fluorocarbon polymer material and consequently be a way of adjusting the solubility of the fluorocarbon polymer material, in particular to make the latter more or less soluble in different solvents. Likewise, the presence of a heteroatom can modify the mechanical properties of the polymer, in particular increasing the flexibility of the fluorocarbon polymer material.

Furthermore, one or more spacer arms of methoxy, ethoxy, thiomethylene, thioethylene, oligo(oxyethylene) and/or oligo (thioethylene) type can be introduced into the pendant chain to separate quaternary ammonium group Z from the fluorocarbon backbone of the material polymer and optionally increase the hydrophilic property of the fluorocarbon polymer material and its flexibility. To obtain such a fluorocarbon polymer material with a spacer arm, the following will be selected in formula (1):

s is equal to 1 and m is an integer comprised between 1 and 5, preferably equal to 1, 2 or 3 and/or;

s and m' are equal to 1.

The presence of a spacer arm can advantageously reduce the interactions between the pendant chain and the backbone, making the function more reactive.

The fluorocarbon polymer materials described can advantageously be used as anion exchange membrane. Anion exchange membrane can comprise the fluorocarbon polymer materials. In particular, a particularly advantageous application of these fluorocarbon polymer materials is to be found as binder or as electrolyte for an alkaline fuel cell when the counter-ion $X^-$ is a hydroxide. Alkaline fuel cell can comprise the fluorocarbon polymer materials of the present invention.

According to a particular embodiment, a method for synthesizing a fluorocarbon polymer material comprises a copolymerization step of at least:
- a first monomer selected from fluorinated vinyl monomers and,
- a second monomer represented by the following formula (9):

$$\underset{R_4}{\left\|-\left[+(Y_1CH_2CH_2)_m-(Y_2-(CH_2)_n)_{m'}-R_1\right]_s-CH_2-Z'\right.} \quad (9)$$

wherein
Z' represents a quaternary ammonium group or a halogen, said halogen preferably being a chlorine or iodine atom,
$Y_1$ and $Y_2$ are each independently an oxygen or a sulphur heteroatom,
$R_1$ represents a phenyl or aryl group or a group of formula (2):

$$-CR_2R_3- \quad (2)$$

wherein:
$R_2$ and $R_3$ are identical or different and each selected independently from the group consisting of a straight or branched alkyl group, optionally substituted by one or more halogens,
$R_4$ is selected from the group consisting of a hydrogen atom, a straight or branched, cyclic or acyclic, alkyl or halogenated alkyl group, and a group represented by the following formula (10):

$$-\left[+(Y_1CH_2CH_2)_m-(Y_2-(CH_2)_n)_{m'}-R_1\right]_s-CH_2-Z' \quad (10)$$

m is an integer comprised between 0 and 10, preferably between 0 and 3;
m' and n are integers, each independently equal to 0 or 1; and s is equal to 0 or 1, provided that when s is equal to 0, then $R_4$ is different from the hydrogen atom.

The copolymerization is advantageously a radical copolymerization. Copolymerization is performed by means of any known method, conventionally in the presence of a initiator such as t-butyl peroxypivalate noted "TBPPI" which is a thermal initiator.

The fluorocarbon polymer material thus obtained comprises a fluorinated backbone and at least one pendant chain having a group Z'. The backbone of the fluorocarbon polymer material thus obtained can contain the unit of general formula (1) described above when Z' is a quaternary ammonium group.

When the first monomer is a fluorinated vinyl monomer, a fluorocarbon polymer material is obtained having a fluorocarbon straight chain A.

The first monomer can advantageously be selected from perfluorinated vinyl monomers.

According to another particular embodiment, the first monomer is a fluorinated vinyl monomer represented by the following formula (11):

$$\underset{F}{\overset{F}{\diagdown}}C=C\underset{W}{\overset{F}{\diagup}} \quad (11)$$

wherein:
W represents a fluorine, bromine or chlorine atom, a $-CF_3$ group or a $-OC_uF_{2u+1}$ group where u is equal to 1, 2 or 3.

According to a preferred embodiment, the first monomer is chloro-trifluoroethylene noted "CTFE". Introducing CTFE into a polymer results in insolubility in water and stability in an alkaline medium. Polymerized CTFE generally gives polymers with hydrophobic property, which are thermally and chemically resistant to acids and to alkalis and which have good mechanical properties. By polymerizing CTFE with the second monomer, different fluorocarbon polymer materials can thus be obtained with properties such as hydrophilic property, cross-linking, flexibility and hydroxide ion conductivity.

According to a particular embodiment, the second monomer is represented by the following formula (12):

$$\underset{R_4}{\left\|-(Y_1CH_2CH_2)_m-(Y_2-(CH_2)_n)_{m'}-R_1-CH_2-Z'\right.} \quad (12)$$

wherein
Z' represents a quaternary ammonium group or a halogen, said halogen preferably being a chloride or iodide atom,
$Y_1$ and $Y_2$ are each independently an oxygen heteroatom or a sulphur heteroatom,
$R_1$ represents a phenyl or aryl group or a group of formula (2):

$$-CR_2R_3- \quad (2)$$

wherein:
$R_2$ and $R_3$ are identical or different and each selected independently from the group consisting of a straight or branched alkyl group, optionally substituted by one or more halogens,
$R_4$ is selected from the group consisting of a hydrogen atom, a straight or branched, cyclic or acyclic, alkyl or halogenated alkyl group, and a group represented by the following formula (13):

$$-(Y_1CH_2CH_2)_m-(Y_2-(CH_2)_n)_{m'}-R_1-CH_2-Z' \quad (13)$$

m is an integer comprised between 0 and 10, preferably between 0 and 3; and
m' and n are integers, each independently equal to 0 or 1.

The second monomer is preferably a vinyl ether or a vinyl thioether represented by the following formula (14):

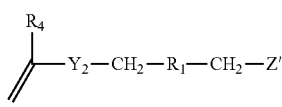
(14)

wherein
Z' represents a quaternary ammonium group or a halogen, said halogen preferably being a chlorine or iodine atom,
$Y_2$ is an oxygen or a sulphur atom,
$R_1$ represents a phenyl or aryl group or a group of formula (2):

$$-CR_2R_3- \quad (2)$$

wherein:
$R_2$ and $R_3$ are identical or different and each selected independently from the group consisting of a straight or branched alkyl group, optionally substituted by one or more halogens,
$R_4$ is selected from the group consisting of a hydrogen atom, a straight or branched, cyclic or acyclic, alkyl or halogenated alkyl group, and a group represented by the following formula (15):

$$Y_2-CH_2-R_1-CH_2-Z' \quad (15)$$

wherein Z', $Y_2$ and $R_1$ are as defined in the foregoing.

The second monomer is advantageously selected from vinyl ethers of formula (12) where each $Y_1$ and $Y_2$ is an oxygen atom. Vinyl ethers present the advantage of not homopolymerizing by radical way. Furthermore, CTFE advantageously copolymerizes with vinyl ethers in alternate manner. This particularity arises from the acceptor nature of CTFE (e=1.56) and from the donor nature of vinyl ethers (−2.0<e<−1.5).

According to a particular embodiment, in formula (12) of the second monomer, Z' represents a halogen atom, preferably a chlorine or iodine atom. The copolymerization step can in this case advantageously be followed by a post-functionalization step of the fluorocarbon polymer material originating from the copolymerization step. This post-functionalization corresponds to a reaction between a tertiary amine and the iodized or fluorinated fluorocarbon polymer material originating from the copolymerization step.

The tertiary amine is preferably selected from trimethylamine, triethylamine, 1,4-diazabicyclo[2.2.2]octane noted "DABCO" and the tertiary amine of formula $NR_5R_6R_7$ where $R_5$, $R_6$ and $R_7$ are identical or different substituents, each selected independently from a straight or branched, cyclic or acyclic, alkyl group.

According to an alternative embodiment, substituents $R_5$, $R_6$ and $R_7$, taken together with the nitrogen atom to which they are bonded, are able to form a 4- to 7-membered heterocyclic group, having optionally a second heteroatom selected from a nitrogen, oxygen or sulphur atom.

To serve as an example illustrating a particular embodiment, a first method for synthesizing consists of the following three successive steps:
Step 1: Synthesis of the Second Monomer by Quaternization of a Tertiary Amine

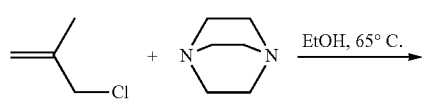

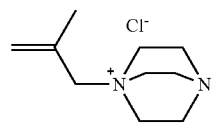

Yield = 95%
(1)

Step 2: Radical Copolymerization of CTFE with the Second Methallyl Monomer (1), Carrier of a Quaternary Ammonium Group

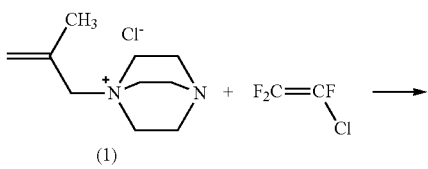

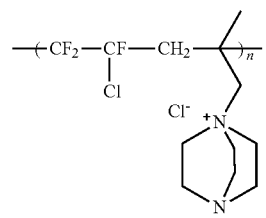

Yield = 41%
(2)

Step 3: Exchange Reaction of the Chloride Counter-Ion by a Hydroxide Ion

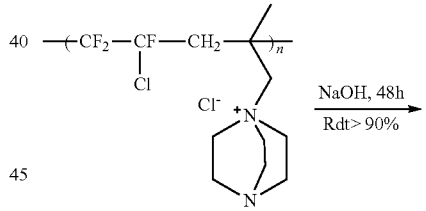

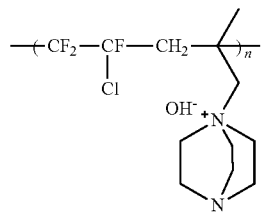

(3)

According to an alternative embodiment, the method for synthesizing consists of the following three successive steps:
Step 1: Synthesis of the Second Monomer

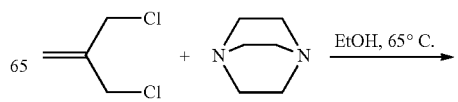

-continued

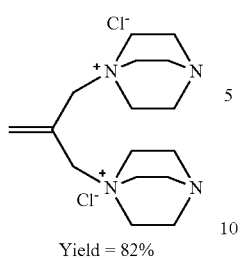

Yield = 82%

Step 2: Radical Copolymerization

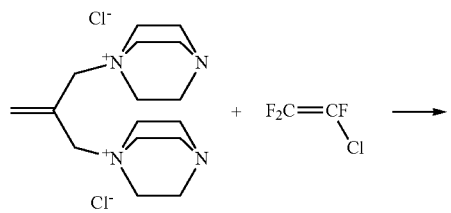

Yield = 51%

Step 3: Exchange Reaction of the Chloride Counter-Ion by a Hydroxide Ion

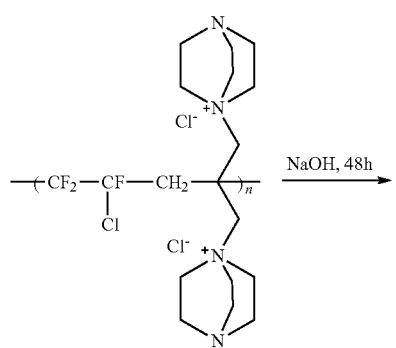

-continued

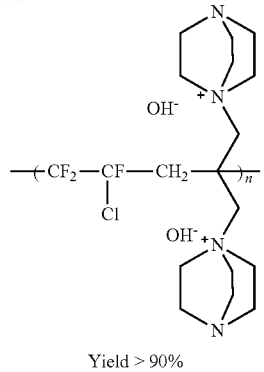

Yield > 90%

As an example illustrating another particular embodiment, a second method for synthesizing consists of the following three successive steps:

Step 1: Synthesis of the Second Monomer

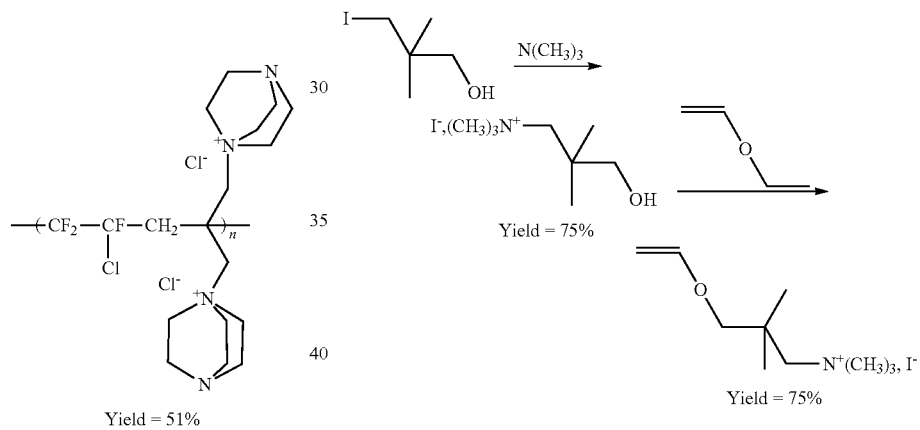

Step 2: Radical Copolymerization

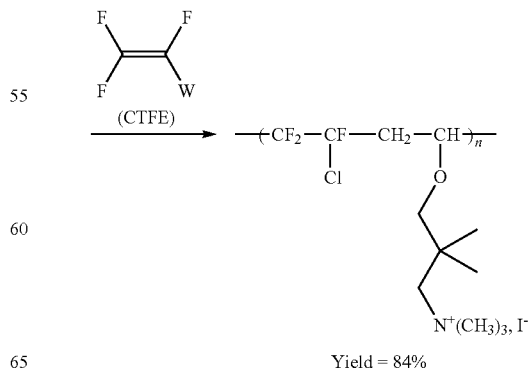

Yield = 84%

Step 3: Exchange Reaction of the Iodide Counter-Ion by a Hydroxide Ion

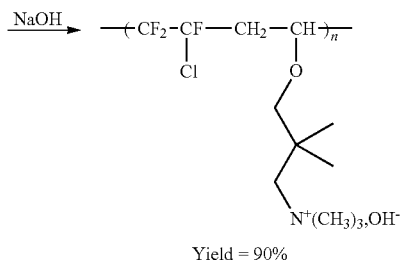

Yield = 90%

As an example illustrating another particular embodiment, a third method for synthesizing consists of the following four successive steps:

Step 1: Synthesis of the Second Monomer

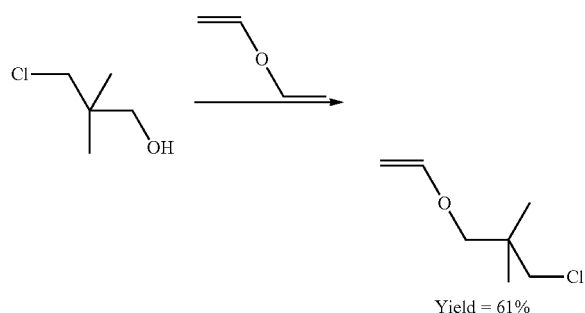

Yield = 61%

Step 2: Radical Copolymerization

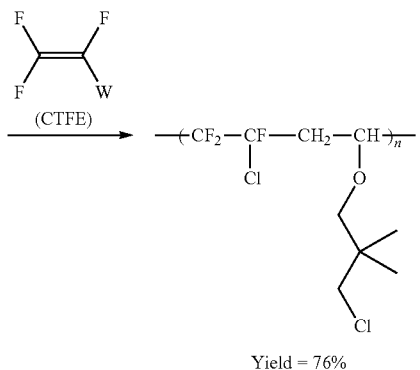

Yield = 76%

Step 3: Post-Functionalization of the Fluorocarbon Polymer Material Obtained

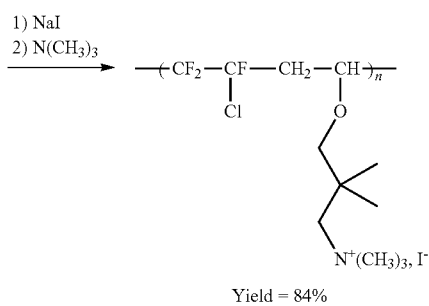

Yield = 84%

Step 4: Exchange Reaction of the Iodide Counter-Ion by a Hydroxide Ion

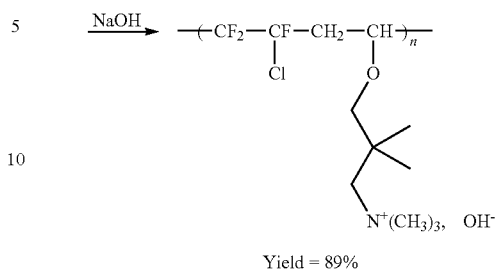

Yield = 89%

EXAMPLES

Example 1

Synthesis of 2-methyl-3-[4-diazabicyclo[2.2.2]octyl]-prop-1-ene chloride (1)

3-chloro-2-methyl-1-propene (40.00 g, 0.44 mol) is solubilized in anhydrous ethanol (200 mL). A solution of 1,4-diazabicyclo[2.2.2]octane (DABCO) (49.55 g, 0.44 mol) in ethanol (100 mL) is then added. The reactive medium is stirred at 65° C. for 48 h. After cooling, the solvent is evaporated and the medium obtained is precipitated in ether. The white solid obtained is washed several times with ether (300 mL) and then dried in a vacuum to give 85 g of the second monomer 1 in the form of a white powder (Yield: 95%).

Radical Copolymerization of CTFE with the Second Methallyl Monomer (1) Carrier of a Quaternary Ammonium Group CTFE being gaseous, the copolymerizations were performed in an autoclave under pressure. This autoclave, equipped with a pressure gauge, an inlet valve, a magnetic stirrer, and a safety disk, undergoes a pressure test with 30 bars of nitrogen. Once the nitrogen has been removed, the reactor is placed in a vacuum for 25 min, then the monomer 1, a TBPPI initiator mixed with a surfactant, ammonium perfluorooctanoate noted "AFPO", and 50 mL of an acetonitrile/water/1,1,1,3,3-pentafluorobutane mixture forming the solvent and then chlorotrifluoroethylene are successively introduced. The autoclave is regulated by heating and placed on a magnetic stirrer heating to 75° C. for 15 h. During copolymerization, a pressure increase first takes place inside the reactor due to the expansion of the gas linked to the temperature increase. A pressure decrease is then observed caused by conversion of the first gaseous fluorinated monomer (CTFE) into a polymer material. After reaction and cooling, the reactor is left in ice for 30 min and then outgassed. The gas conversion is calculated by $(m-\delta m)/m$ where m and $\delta m$ respectively designate the masses of initial CTFE and the mass difference before and after outgassing. $\delta m=0$ means that the conversion rate of the CTFE is 100%. After the reactor has been opened, the medium is extracted twice with 200 ml of 2-butanone and the organic phase is evaporated in a vacuum. The product is dissolved in chloroform and then precipitated in methanol at ambient temperature to eliminate the rests of solvent, monomers, initiators and oligomers. The solution is filtered and the fluorocarbon polymer material is then placed in an oven in a vacuum at 50° C. to be dried overnight. The fluorocarbon polymer material is obtained in the form of a white powder (Yield=41% and conversion rate=53%).

Exchange Reaction of the Chloride Counter-Ion by a Hydroxide Ion

The polymer is immersed in a solution of sodium hydroxide 1M, under stirring for 48 h. The polymer is washed several times with water and dried in a vacuum at 50° C. The yield is greater than 95%.

Example 2

Synthesis of 2,3-bis-[4-diazabicyclo[2.2.2]octyl]-isobut-1-ene chloride the second monomer is synthesized according to an identical procedure to that of example 1 described in the foregoing, starting from 3-chloro-2-chloromethyl-1-propene (5.0 g, 0.04 mol) and 2 equivalents of 1,4-diazabicyclo[2.2.2]octane (DABCO) (8.90 g, 0.08 mol) in anhydrous ethanol (50 mL). The white solid obtained is precipitated and washed with ether (25 mL) to give 11.5 g of 2-3-bis-[4-diazabicyclo[2.2.2]octyl]-isobut-1-ene (Yield: 82%). Copolymerization and the exchange reaction are performed by means of an identical procedure to example 1 with yields of respectively 51% and 95%.

Example 3

Synthesis of 3-iodo-(2,2-dimethyl)-1-propanol 3-chloro-(2,2-dimethyl)-1-propanol is solubilized in anhydrous acetone. 3 equivalents of sodium iodide are then inserted in the flask which is placed in an oil bath on a heating stirrer. The reactive medium is stirred at 65° C. for 7 days. The reactive medium is then filtered to eliminate the sodium chloride formed and is then dried in a vacuum. The residue obtained is distilled in a vacuum to give 3-Iodo-(2,2-dimethyl)-1-propanol in the form of a white powder.

Synthesis of 3-[N,N, N-trimethylammonium]-(2,2-dimethylpropyl)-vinyl ether iodide from 3-iodo-(2,2-dimethylpropyl)-vinyl ether in a 100 mL reactor, the 3-iodo-(2,2-dimethyl)-1-propanol obtained is solubilized in acetone. 3 equivalents of trimethylamine are added, and the reaction is then brought to reflux for 48 h. The product is dried by evaporation of the amine and of the acetone to lead to a white powder corresponding to 3-[N, N, N-trimethylammonium]-(2,2-dimethyl)-1-propanol iodide.

In a Schlenk, palladium acetate (0.89 g, 4.01 mmol) is solubilized in dichloromethane (25 mL). A solution of 1-phenanthroline (1.08 g, 6.09 mmol) in dichloromethane (10 mL) is then added. The reactive medium is stirred at ambient temperature for 30 minutes to generate the palladium catalyst in situ. A solution composed of 3-[N,N,N-trimethylammonium]-(2,2-dimethyl)-1-propanol iodide (24.5 g, 0.095 mol) and ethyl vinyl ether (43.40 g, 0.60 mol) is added to the solution and the reactive medium is then placed in an autoclave. This solution is heated to 60° C. for 24 h. After evaporation in a vacuum followed by distillation of the residue in a vacuum, 3-[N,N,N-trimethylammonium]-(2,2-dimethylpropyl)-vinyl ether iodide is obtained in the form of a colorless liquid (65-70° C./0.30 mmHg) with an yield of 75%. Radical copolymerization of CTFE with 3-[N,N,N-trimethylammonium]-(2,2-dimethylpropyl)-vinyl ether iodide and the exchange reaction are performed according to an identical procedure to example 1 except that the 3-[N,N,N-trimethylammonium]-(2,2-dimethylpropyl)-vinyl ether iodide is placed in the reactor in a vacuum with TBPPI, $K_2CO_3$, 50 mL of 1,1,1,3,3-pentafluorobutane and chlorotrifluoroethylene, and that after polymerization, the reactor is opened and the crude of the polymerization is dissolved in acetone and then precipitated in methanol to eliminate the rests of solvent, the monomers, $K_2CO_3$, the initiator and the oligomers. The yields of the radical copolymerization and of the exchange reaction are respectively 84% and 90%.

Example 4

Synthesis of 3-chloro-(2,2-dimethylpropyl)-vinyl ether by a trans-etherification reaction of ethyl vinyl ether In a Schlenk, palladium acetate (1.09 g, 4.88 mmol) is solubilized in dichloromethane (25 mL). A solution of 1-phenanthroline (1.32 g, 7.43 mmol) in dichloromethane (10 mL) is then added. The reactive medium is stirred at ambient temperature for 30 minutes to generate the palladium catalyst in situ. A solution composed of 3-chloro-2,2-dimethyl-1-propanol (30 g, 0.22 mol) and ethyl vinyl ether (52.93 g, 0.73 mol) is added to the solution and the reactive medium is then placed in an autoclave. The reactive medium is heated to 60° C. for 24 h. The dichloromethane and ethyl vinyl ether are then evaporated in a vacuum and the residue obtained is distilled in a vacuum to give the monomer in the form of a colorless liquid (85° C., 25 mmHg) with a yield of 61%.

Copolymerization of CTFE with 3-chloro-2,2-dimethylpropyl)-vinyl ether:

Radical copolymerization is performed according to an identical procedure to example 3 with a yield of 76%.

Chemical Modification and Exchange Reaction of Chloride Counter-Ions by Hydroxide Ions:

the polymer is solubilized in acetone in a flask equipped with a refrigerant. 3 equivalents of sodium iodide are then introduced into the flask which is placed in an oil bath on a heating stirrer. The reaction lasts for 7 days, at reflux. The polymer is then filtered, precipitated in methanol to remove NaI and NaCl and then dried in a vacuum at 50° C. The iodic polymer obtained is then solubilized in acetone in a reactor. Trimethylamine (3 eq/iodic sites of the polymer) is added and the reaction is then taken to 40° C. for 24 h and then to reflux for 24 h. The polymer is dried by evaporation of the amine and the acetone. The polymer is immersed in a solution of sodium hydroxide 1M, under stirring for 48 h. The polymer is washed several times with water and dried in a vacuum at 50° C. The polymer in the form of a brown powder is obtained with a yield of more than 90%.

The results of the examples are set out in the table below.

TABLE

FLUOROCARBON POLYMER MATERIALS OBTAINED BY COPOLYMERIZATION OF CTFE WITH A SECOND MONOMER

| Synthesis method n°/ex. n° | Second monomer | Second monomer yield (%) | Polymerization yield (%)/ conversion rate (%) | Ion exchange capacity (meq.g$^{-1}$) |
|---|---|---|---|---|
| 1$^{st}$/1 | (structure) | 95 | 41/53 | 1.22 |
| 1$^{st}$/2 | (structure) | 82 | 51/60 | 2.17 |
| 2$^{nd}$/3 | (structure) | 75 | 84/90 | 3.15 |
| 1$^{st}$/4 | (structure) | 61 | 76/95 | 3.27 |

According to a preferred particular embodiment, the fluorocarbon polymer material of formula (1) can be synthesized by the methods for synthesizing a fluorocarbon polymer material described in the foregoing. A wide range of fluorocarbon polymer materials can thus be prepared presenting variable molar masses and quaternary ammonium contents, paving the way for various binders or membranes having distinct thermal, physicochemical and electrochemical properties.

The method for synthesizing according to the invention further enables control of the degree of functionalization of the fluorocarbon polymer material and its solubility in different solvents, in particular polar solvents. The method for synthesizing is simple to implement and enables different fluorocarbon polymer materials to be obtained that are stable in an alkaline medium, inexpensive, insoluble in water and more easily degradable than NAFION® membranes of the prior art.

The hydrophobic property of the fluorocarbon polymer material of the invention further makes the latter a suitable material for an application as anion exchange membrane, in particular as binder and/or electrolyte for an alkaline fuel cell.

The invention claimed is:

1. A fluorocarbon polymer material which comprises a fluorinated backbone and at least one pendant chain having a quaternary ammonium group, wherein the backbone comprises a unit of the following general formula:

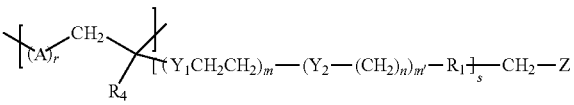
(1)

wherein:

Z is a quaternary ammonium group, $Y_1$ and $Y_2$ are each independently an oxygen heteroatom or a sulphur heteroatom, A is a fluorinated or perfluorinated straight chain having from 2 to 6 carbon atoms, $R_1$ represents a phenyl or aryl group or a group of the following formula:

(2)

wherein:

$R_2$ and $R_3$ are identical or different and each selected independently from the group consisting of a straight or branched alkyl group, optionally substituted by one or more halogens, $R_4$ is selected from the group consisting of a hydrogen atom, a straight or branched, cyclic or acyclic, alkyl or halogenated alkyl group, and a group represented by the following formula:

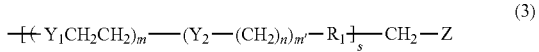

m is an integer comprised between 0 and 10;
m', n and r are integers, each independently equal to 0 or 1; and
s is equal to 0 or 1, provided that when s is equal 0, then $R_4$ is different from the hydrogen atom.

2. The fluorocarbon polymer material according to claim 1, wherein m is an integer comprised between 0 and 3.

3. The fluorocarbon polymer material according to claim 1, wherein A is represented by the following formula:

wherein:
W represents a fluorine, bromine or chlorine atom, a —$CF_3$ group or a —$OC_uF_{2u+1}$ group where u is equal to 1, 2 or 3.

4. The fluorocarbon polymer material according to claim 1, wherein Z is selected from the quaternary ammoniums of the following formula:

wherein:
$R_5$, $R_6$ and $R_7$ are identical or different substituents each selected independently from the group consisting of a straight or branched, cyclic or acyclic, alkyl group, said substituents $R_5$, $R_6$ and $R_7$, taken together with the nitrogen atom to which they are bonded, being able to form a 4- to 7-membered heterocyclic group, having optionally a second heteroatom selected from a nitrogen, oxygen or sulphur atom; and
$X^-$ is a hydroxide or halide counter-ion.

5. The fluorocarbon polymer material according to claim 4, wherein $X^-$ is a chloride or iodide counter-ion.

6. The fluorocarbon polymer material according to claim 1, wherein the backbone comprises at least one unit represented by the following formula:

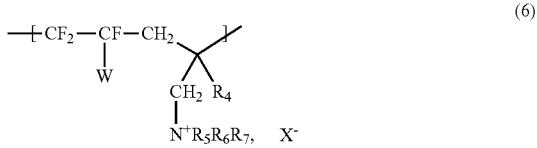

wherein:
W represents a fluorine, bromine or chlorine atom, a —$CF_3$ group or a —$OC_uF_{2u+1}$ group where u is equal to 1, 2 or 3,
$R_5$, $R_6$ and $R_7$ are identical or different substituents each selected independently from the group consisting of a straight or branched, cyclic or acyclic, alkyl group, said substituents $R_5$, $R_6$ and $R_7$, taken together with the nitrogen atom to which they are bonded, being able to form a 4- to 7-membered heterocyclic group, having optionally a second heteroatom selected from a nitrogen, oxygen or sulphur atom;
$X^-$ is a hydroxide or halide counter-ion; and $R_4$ is selected from the group consisting of a straight or branched, cyclic or acyclic, alkyl or halogenated alkyl group, and a —$CH_2$—$N^+R_5R_6R_7$, $X^-$ group.

7. The fluorocarbon polymer material according to claim 6, wherein $X^-$ is a chloride or iodide counter-ion.

8. The fluorocarbon polymer material according to claim 6, wherein the backbone comprises at least one unit represented by the following formula:

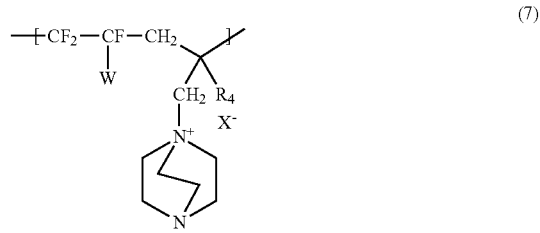

wherein
W represents a fluorine, bromine or chlorine atom, a —$CF_3$ group or a —$OC_uF_{2u+1}$ group where u is equal to 1, 2 or 3,
$X^-$ is a hydroxide or halide counter-ion; and
$R_4$ is selected from the group consisting of a straight or branched, cyclic or acyclic, alkyl or halogenated alkyl group, and a group represented by the following formula:

9. The fluorocarbon polymer material according to claim 8, wherein $X^-$ is a chloride or iodide counter-ion.

10. A method for synthesizing a fluorocarbon polymer material, comprising a copolymerization step of at least:
a first monomer selected from fluorinated vinyl monomers and,
a second monomer represented by the following formula:

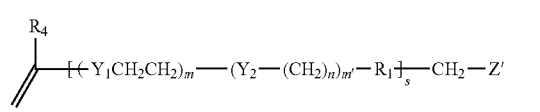

wherein
Z' represents a quaternary ammonium group or a halogen,
$Y_1$ and $Y_2$ are each independently an oxygen heteroatom or a sulphur heteroatom,
$R_1$ represents a phenyl or aryl group or a group of formula:

wherein:
$R_2$ and $R_3$ are identical or different and each selected independently from the group consisting of a straight or branched alkyl group, optionally substituted by one or more halogens, $R_4$ is selected from the group consisting of a hydrogen atom, a straight or branched, cyclic or acyclic, alkyl or halogenated alkyl group, and a group represented by the following formula:

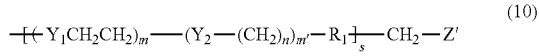  (10)

m is an integer comprised between 0 and 10;

m' and n are integers, each independently equal to 0 or 1; and s is equal to 0 or 1, provided that when s is equal to 0, then $R_4$ is different from the hydrogen atom.

11. The fluorocarbon polymer material according to claim 10, wherein Z' represents a chlorine or iodine atom.

12. The fluorocarbon polymer material according to claim 10, wherein m is an integer comprised between 0 and 3.

13. The method according to claim 10, wherein the copolymerization is a radical copolymerization.

14. The method according to claim 10, wherein the first monomer is a fluorinated vinyl monomer represented by the following formula:

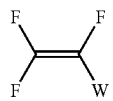  (11)

wherein:

W represents a fluorine, bromine or chlorine atom, a $—CF_3$ group or a $—OC_uF_{2u+1}$ group where u is equal to 1, 2 or 3.

15. The method according to claim 10, wherein the second monomer is represented by the following formula:

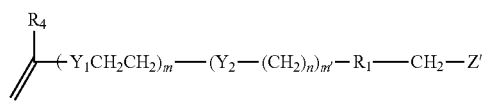  (12)

wherein

Z' represents a quaternary ammonium group or a halogen, $Y_1$ and $Y_2$ are each independently an oxygen heteroatom or a sulphur heteroatom, $R_1$ represents a phenyl or aryl group or a group of formula:

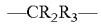  (2)

wherein:

$R_2$ and $R_3$ are identical or different and each selected independently from the group consisting of a straight or branched alkyl group optionally substituted by one or more halogens, $R_4$ is selected from the group consisting of a hydrogen atom, a straight or branched, cyclic or acyclic, alkyl or halogenated alkyl group, and a group represented by the following formula:

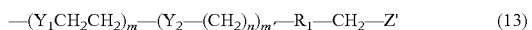  (13)

m is an integer comprised between 0 and 10; and m' and n are integers, each independently equal to 0 or 1.

16. The fluorocarbon polymer material according to claim 15, wherein m is an integer comprised between 0 and 3.

17. The method according to claim 15, wherein the second monomer is selected from vinyl ethers where each $Y_1$ and $Y_2$ is an oxygen atom.

18. The method according to claim 10, wherein the second monomer is a vinyl ether represented by the following formula:

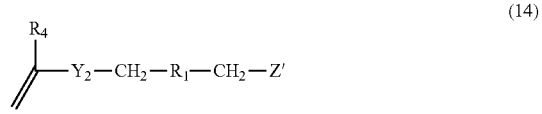  (14)

wherein

Z' represents a quaternary ammonium group or a halogen, $Y_2$ is a oxygen heteroatom or sulphur heteroatom, $R_1$ represents a phenyl or aryl group or a group of formula:

  (2)

wherein:

$R_2$ and $R_3$ are identical or different and each selected independently from the group consisting of a straight or branched alkyl group, optionally substituted by one or more halogens, $R_4$ is selected from the group consisting of a hydrogen atom, a straight or branched, cyclic or acyclic, alkyl or alkyl halogenated group, and a group represented by the following formula:

  (15)

wherein Z', $Y_2$ and $R_1$ are as defined above.

19. Anion exchange membrane comprising a fluorocarbon polymer material according to claim 1.

20. Alkaline fuel cell comprising a fluorocarbon polymer material according to claim 1 as binder or as electrolyte.

* * * * *